US012530263B2

(12) United States Patent
Dharmapurikar et al.

(10) Patent No.: US 12,530,263 B2
(45) Date of Patent: Jan. 20, 2026

(54) GENERATION-BASED PROTECTION SET SYNCHRONIZATION

(71) Applicant: Rubrik, Inc., Palo Alto, CA (US)

(72) Inventors: Abhishek Dharmapurikar, San Jose, CA (US); Rajath Subramanyam, San Jose, CA (US); Li Ding, Cupertino, CA (US)

(73) Assignee: Rubrik, Inc., Palo Alto, CA (US)

( * ) Notice: Subject to any disclaimer, the term of this patent is extended or adjusted under 35 U.S.C. 154(b) by 90 days.

(21) Appl. No.: 18/646,352

(22) Filed: Apr. 25, 2024

(65) Prior Publication Data

US 2025/0335306 A1    Oct. 30, 2025

(51) Int. Cl.
*G06F 16/27* (2019.01)
*G06F 11/14* (2006.01)

(52) U.S. Cl.
CPC .......... *G06F 11/1458* (2013.01); *G06F 16/27* (2019.01); *G06F 2201/84* (2013.01)

(58) Field of Classification Search
CPC .... G06F 11/1458; G06F 16/27; G06F 16/273; G06F 16/275; G06F 16/278; G06F 2201/84
See application file for complete search history.

(56) References Cited

U.S. PATENT DOCUMENTS

| | | | |
|---|---|---|---|
| 11,392,557 B1 * | 7/2022 | Fuller | G06F 11/1461 |
| 12,229,012 B2 * | 2/2025 | Agrawal | G06F 11/1461 |
| 2016/0077926 A1 * | 3/2016 | Mutalik | G06F 16/1844 |
| | | | 711/162 |
| 2020/0012572 A1 * | 1/2020 | Chopra | G06F 21/60 |
| 2020/0117365 A1 * | 4/2020 | Patwardhan | G06F 3/0671 |

* cited by examiner

*Primary Examiner* — Merilyn P Nguyen
(74) *Attorney, Agent, or Firm* — Holland & Hart LLP

(57) ABSTRACT

Methods, systems, and devices for data management are described. A data management system (DMS) may maintain a set of backup parameters for backups of data stored by a computing system. The computing system may store a copy of the set of backup parameters. The set of backup parameters may be modified at the DMS, the computing system, or both. To synchronize, the DMS may obtain a value of a first generation identifier (ID) associated with and a first state of the set of backup parameters as stored by the computing system. The DMS may compare the first state with a second state of the set as stored by the DMS and may compare the value of the first generation ID with a value of a second generation ID as stored by the DMS. The DMS may determine whether to modify the set of backup parameters based on the comparisons.

20 Claims, 9 Drawing Sheets

| DMS State | Computing System State | DMS Generation ID | Computing System Generation ID | Final Status |
|---|---|---|---|---|
| X | X' | n | n+1 | Computing System Status: X'<br>DMS Status: X'<br>Generation ID: n+1 |
| X | X' | n | n | Computing System Status: X<br>DMS Status: X<br>Generation ID: n |
| X | Y | n+1 | n | N/A |
| X | X | n | n+1 | Computing System Status: X<br>DMS Status: X<br>Generation ID: n+1 |

FIG. 3

GENERATION-BASED PROTECTION SET SYNCHRONIZATION

FIELD OF TECHNOLOGY

The present disclosure relates generally to data management, including techniques for generation-based protection set synchronization.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIG. 3 shows an example of a synchronization state table that supports generation-based protection set synchronization in accordance with aspects of the present disclosure.

DETAILED DESCRIPTION

Figure 1:
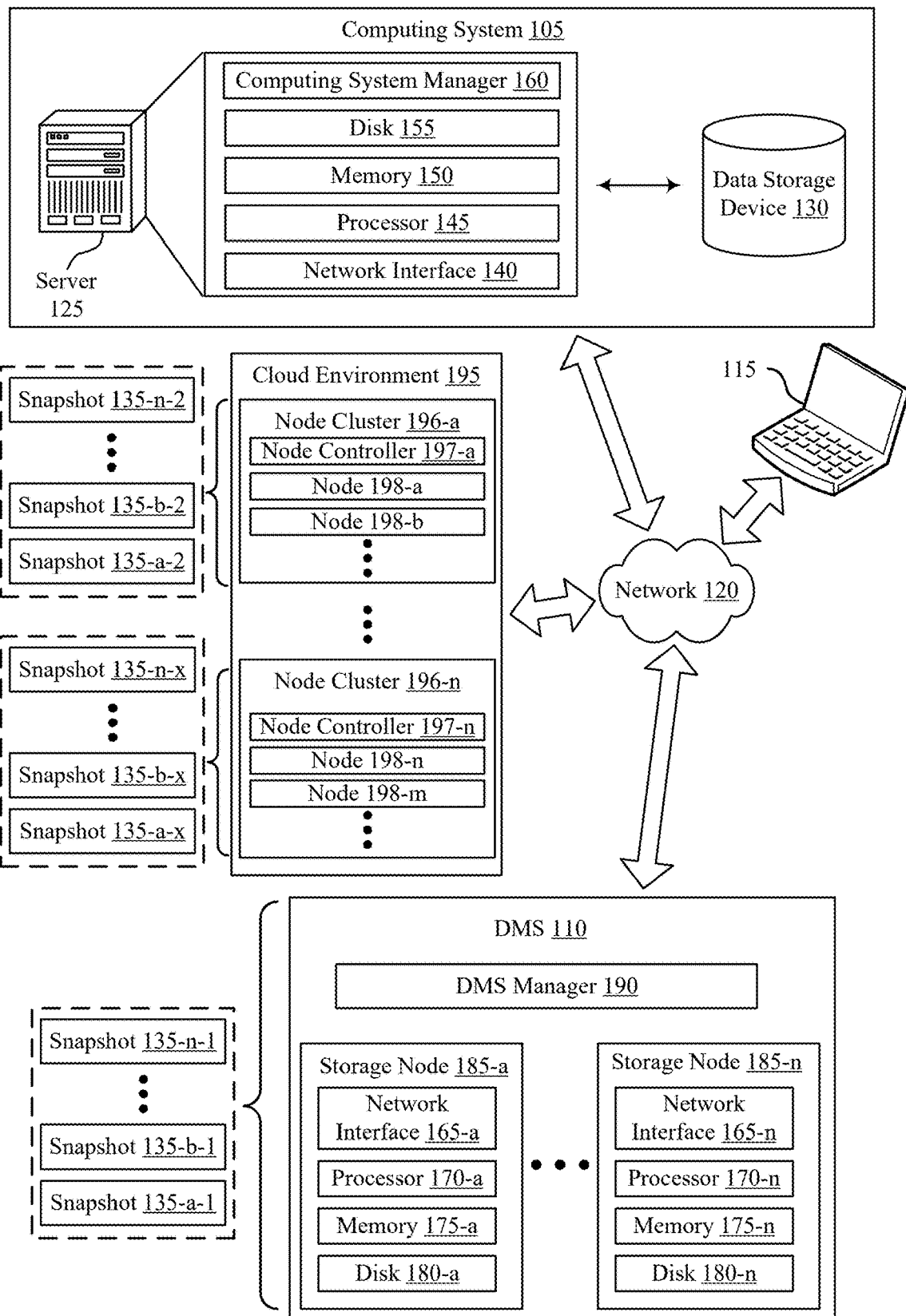
FIG. 1 illustrates an example of a computing environment that supports generation-based protection set synchronization in accordance with aspects of the present disclosure.

A data management system (DMS) may backup and manage data stored within or otherwise associated with a computing system (e.g., a Kubernetes computing system or some other type of computing system) that is external to the DMS. The DMS may obtain and store backups of the data over time. The DMS may utilize one or more protection sets (e.g., sets of backup parameters) to facilitate the backups, where a protection set may indicate a set of computing objects at the computing system that the DMS is to backup as well as a frequency associated with the backups, among other backup-related parameters. A user may request to change which objects are to be backed up, a timing for the backups, or both. The user may request changes to the backup policy via the DMS by logging in to a user interface associated with the DMS and making the request, or via a separate user interface associated with the target computing system, or both. Techniques for synchronizing protection sets (e.g., backup policy information) between the DMS and the computing system when both the DMS interface and a separate interface for the computing system facilitate requests to change the protection sets may improve reliability and consistency of the data backups.

Aspects of the disclosure herein provide for improved synchronization between the DMS and the computing system with respect to the protection sets defined for the computing system, among other potential benefits. The protection sets may include a generation identifier (ID) in addition to the indication of the set of computing objects (e.g., a filter), the backup frequency (e.g., service level agreement (SLA) information), whether there are any pre or post commands to run during a snapshot (e.g., hooks), or any combination thereof. That is, a protection set may include a set of backup parameters and a corresponding generation ID, where a value of the generation ID may be modified in response to a modification of the state of the set of backup parameters. The DMS may store the set of backup parameters and a first generation ID associated with the set of backup parameters as stored by the DMS. The computing system may store the set of backup parameters and a second generation ID associated with the set of backup parameters as stored by the computing system. The generation ID for a protection set (e.g., the second generation ID) may be updated by the computing system any time the computing system identifies or makes a change to the protection set. The generation ID may provide for the computing system and the DMS to keep a record of a most recent generation of the protection set as registered by the computing system.

If the computing system receives a request to create or update the set of backup parameters (e.g., via the interface associated with the computing system), the computing system may perform the update to modify a state of the set of backup parameters as stored by the computing system, and the computing system may update a value of the second generation ID accordingly (e.g., increment the generation ID by one). An agent of the DMS may be installed at the computing system, and the agent may automatically report the changes to the DMS via an application programming interface (API) between the DMS and the computing system. The DMS may separately maintain information regarding the protection set in a database of the DMS, and the DMS may update the state of the protection set and the value of the first generation ID as stored by the DMS based on the indication received from the computing system, such that the DMS and the computing system may be in sync.

If the DMS receives a request to update a protection set (e.g., via the interface associated with the DMS), the DMS may update the database at the DMS to reflect the updated protection set, but the DMS may not increment the generation ID. That is, the DMS may modify a state of the set of backup parameters as stored by the DMS but may maintain the value of the first generation ID. If the DMS receives a request to create a protection set, the DMS may create the protection set and assign an initial value of the first generation ID for the protection set. The DMS may periodically execute a synchronization job to reconcile the state of the set of backup parameters as maintained at the DMS relative to the state of the backup parameters as maintained at the computing system, such that any changes made at the DMS may be propagated to the computing system. For example, the synchronization job may read a first state of a set of backup parameters stored at the computing system via an API and may compare the first state with a second state of the set of backup parameters stored at the DMS. The synchronization job may additionally compare a value of a first generation ID stored by the DMS with a value of a second generation ID stored by the computing system. If the states are the same or different and are associated with different generation IDs, the DMS may update the set of backup parameters stored by the DMS to match the set of backup parameters stored by the computing system, including updating the value of the first generation ID. If the states are different and are associated with a same value of the generation ID, the DMS may instruct the computing system to update its set of backup parameters to match the state of the set of backup parameters as stored by the DMS. The DMS and the computing system may thereby synchronize backup parameters (e.g., protection set parameters) over time, such that a user may request changes to backup policies via either the DMS user interface or the computing user interface, or both, while maintaining consistency.

FIG. 1 illustrates an example of a computing environment 100 that supports generation-based protection set synchronization in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-$a$ may be associated with the first customer or tenant associated with the computing system 105. The DMS 110 may obtain (e.g., generate or receive) and transfer the snapshots 135 associated with the computing system 105 to the node cluster 196-$a$ in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-$n$ in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

The DMS 110 may utilize one or more protection sets to facilitate backups of data stored within or otherwise associated with the computing system 105. A protection set may indicate a set of computing objects at the computing system that the DMS 110 is to backup as well as a frequency associated with the backups, an SLA associated with protection of the computing objects, whether there are any pre or post commands to run during a snapshot (e.g., hooks), or any combination thereof, among other backup-related parameters. A user (e.g., the computing device 115) may request to change which objects are to be backed up, a timing for the backups, or both. The user may request changes to the backup policy via the DMS 110 by logging in to a user interface associated with the DMS 110 and making the request, or via a separate user interface associated with the target computing system 105, or both. Techniques for synchronizing protection sets (e.g., backup policy information) between the DMS 110 and the computing system 105 when both the DMS interface and a separate interface for the computing system 105 facilitate requests to change the protection sets may improve reliability and consistency of the data backups.

Techniques, systems, and devices described herein provide for the ability for one or more users to update a state of a backup and management system via two or more separate interfaces associated with the DMS 110 and the computing system 105. For example, the DMS 110 and the computing system 105 may support one or more synchronization techniques to reconcile updates from both interfaces to synchronize an eventual consistent view of a current state at both the DMS 110 and the computing system 105. The described synchronization techniques may provide for users to optionally update backup parameters at either the DMS 110 or the computing system 105 or both (e.g., instead of only one interface supporting updates).

Figure 2:
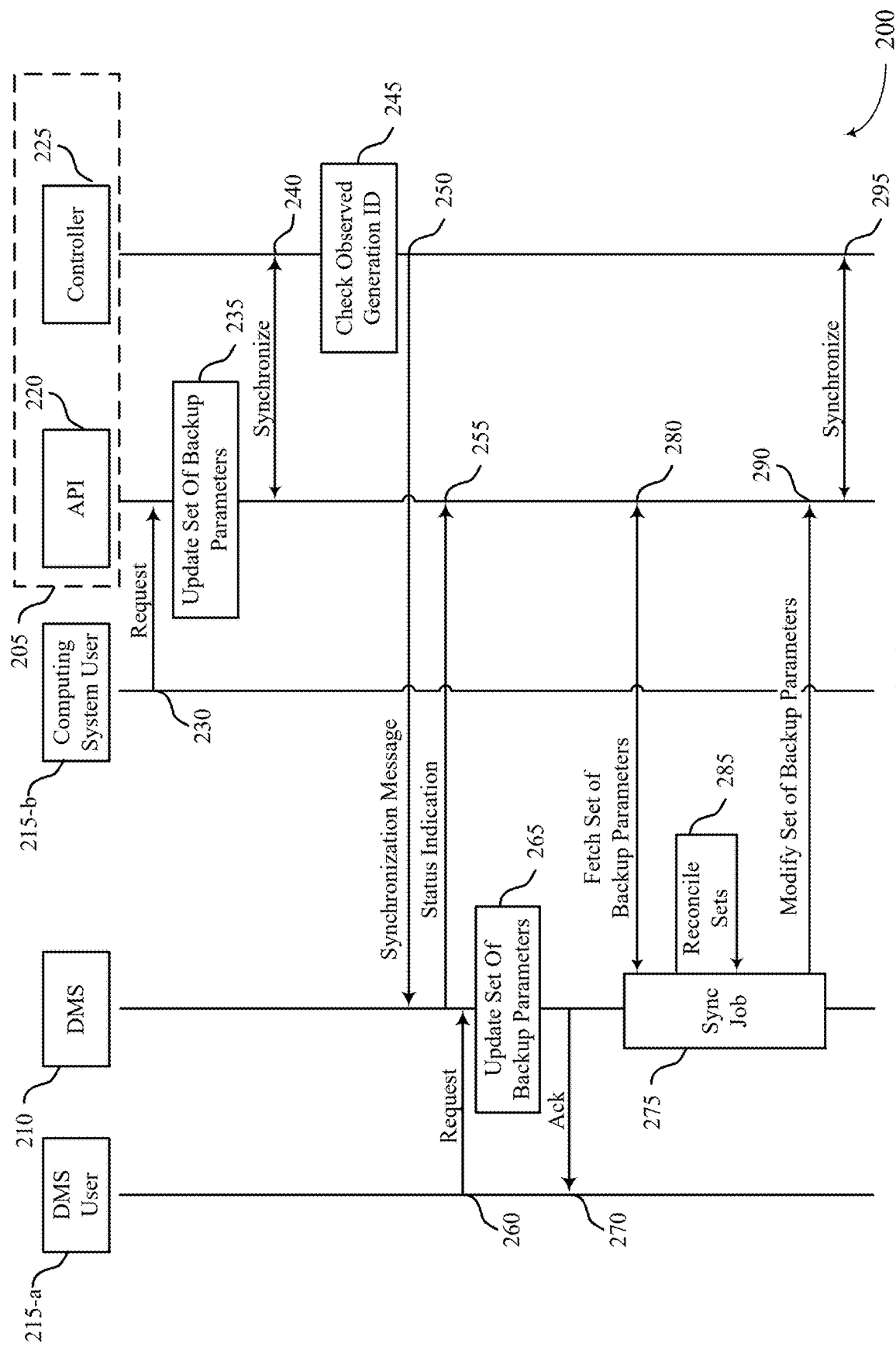
FIG. 2 shows an example of a flow diagram that supports generation-based protection set synchronization in accordance with aspects of the present disclosure.

FIG. 2 shows an example of a flow diagram 200 that supports generation-based protection set synchronization in accordance with aspects of the present disclosure. The flow diagram 200 may implement or be implemented by aspects of FIG. 1. For example, the flow diagram 200 may be implemented by DMS 210, which may represent an example of a corresponding DMS 110 as described with reference to FIG. 1. In this example, the DMS 210 may be coupled with, or otherwise be in communication with a computing system 205, which may represent an example of a corresponding computing system 105 as described with reference to FIG. 1. The DMS 210 may provide data backup and management services for one or more users, including a DMS user 215-*a*, which may represent an example of a computing device 115 (e.g., a user or other administrator of user data). The computing system 205 may additionally, or alternatively, support one or more users, including the computing system user 215-*b*, which may represent an example of a computing device 115 (e.g., a user or other administrator of user data). As described herein, the DMS 210 and the computing system 205 may perform one or more operations to synchronize backup parameter sets over time.

In some aspects, the operations illustrated in the flow diagram 200 may be performed by hardware (e.g., including circuitry, processing blocks, logic components, and other components), code (e.g., software or firmware) executed by a processor, or any combination thereof. For example, aspects of the flow diagram 200 may be implemented or managed by a DMS 210, a synchronization component 620, a controller, some other software or application that is associated with data backup and recovery, or any combination thereof.

The DMS 210 may provide data backup and management services for one or more clients, where a client's data may be stored on or otherwise associated with (e.g., accessible through) a computing system 205. The DMS 210 may obtain one or more backups of the client data over time. The resources that are backed up, timing for the backups, and one or more other aspects of the backups may be determined by or performed based on a set of backup parameters stored by the DMS 210. The DMS 210 may store the set of backup parameters as a snappable.

In some examples, the computing system 205 may additionally store a copy of the set of backup parameters. For example, an initial state of the set of backup parameters may be copied from the DMS 210 to the computing system 205 via a custom resource definition (CRD) or some other process with a same name. The specification or declaration of the set of backup parameters (e.g., what filter, hooks, and SLA the set uses) may be created, updated, or both on both the DMS 210 via a DMS API and on the computing system 205 via a computing system API. Although described with reference to a single set of backup parameters herein, it is to be understood that the DMS 210 and the computing system 205 may store multiple sets of backup parameters, where each set may be copied at both locations and each set may be associated with a respective generation ID at the DMS 210 and a respective generation ID at the computing system 205.

The set of backup parameters may be stored in a snappable format on both the DMS 210 and the computing system 205. That is, the set of backup parameters (e.g., a protection set) may include or otherwise be associated with a generation ID, which may have different values based on a state of the backup parameters, a name, a filter (e.g., which computing resources are to be backed up), a universally unique ID (UUID) for a SLA associated with backing up the computing resources, one or more labels associated with the computing resources, one or more names associated with the computing resources, one or more types associated with the computing resources, one or more workload resources associated with backups by the DMS 210, or any combination thereof. In some examples, a computing resource as described herein may represent an example of a storage resource, a computing resource, a networking resource, or some other type of resource.

The computing system 205 may include the API 220 (e.g., an API server) and the controller 225. The controller 225 may be an agent supported by the DMS 210 that is installed on or otherwise executes within the computing system 205. The controller 225 may attempt to synchronize the generation ID with the DMS 210. The controller 225 may, for example, monitor a value of an observed generation ID (e.g., status: observedGeneration: <last generation controller worked on>) stored by the computing system 205 (e.g., at an API server), which may have a value that has been synchronized with the DMS 210, as described herein.

The flow diagram 200 illustrates an example set of operations for synchronization of backup sets between the DMS 210 and the computing system 205. Although each of these components are illustrated in FIG. 2, it is to be understood that the process to synchronize backup parameters as described herein may be performed by any one or more components of a DMS 210, a computing system 205, and one or more users, including the components and entities illustrated in FIG. 2 or other components not shown. Additionally, or alternatively, one or more components may perform tasks or may be configured to function in a different manner than illustrated in FIG. 2. Alternative examples of the following may be implemented, where some steps are performed in a different order than described or are not performed at all. In some cases, steps may include additional features not mentioned below, further steps may be added, or different components may perform the steps.

At 230, the computing system user 215-*b* (e.g., via a computing device 115) may transmit, to the computing system 205 via the computing system API 220 (e.g., a user interface), a request to modify or create a set of backup parameters. At 235, if the request is to create a new set of backup parameters, the API 220 may create the new set of backup parameters and a generation ID for the new set of backup parameters. The generation ID may be set to a default value (e.g., zero, one, or some other initial value) at the computing system 205. If the request is to modify an existing set of backup parameters, the API 220 may modify a state of the set of backup parameters as stored by the computing system 205. For example, the API 220 may change one or more parameters in the set. The API 220 may increment the value of the generation ID associated with the set based on modifying the set.

At 240, the API 220 and the controller 225 of the computing system 205 may synchronize. For example, in response to modifying the generation ID for a set of backup parameters, the API 220 may indicate the modified generation ID to the controller 225.

At 245, the controller 225 may determine whether the observed generation ID maintained by the computing system 205 (e.g., stored at a location in or otherwise coupled with the computing system 205, maintained by the controller 225, or both) matches the value of the generation ID at the API 220. If the values match, the controller 225 may assume that any changes have been pushed to the DMS 210 and the DMS 210 and the computing system 205 may be in synchronization. However, if the values of the IDs do not match, the controller 225 may determine that there is at least one change that has not yet been pushed to the DMS 210, and the controller 225 may generate a synchronization message accordingly and send the synchronization message to the DMS 210 directly (e.g., not via the API 220).

At 250, the controller 225 may transmit the synchronization message to the DMS 210 to indicate the at least one change. For example, the controller 225 may push a notification of the updated value of the generation ID and the updated state of the set of backup parameters to the DMS 210. At 250, the DMS 210 may modify the state of the set of backup parameters as stored by the DMS 210, may modify the value of the generation ID as stored by the DMS 210, or both to match the state of the set of backup parameters and the value of the generation ID as stored by the computing system 205.

At 255, in some examples, the DMS 210 may transmit a status indication to the controller 225, the API 220, or some other component in the computing system 205 to indicate that the DMS 210 successfully received the push notification and modified the backup set accordingly. The status indication may indicate the current status of the set of backup parameters as stored by the DMS 210. In some examples, the status may be an example of a sub-resource, instead of a resource, such that any change in the status of the set of backup parameters as stored by the DMS 210 may not trigger a change in the value of the generation ID as stored by the computing system 205. For example, once the computing system 205 receives the status indication, the computing system 205 may not modify its generation ID again. Instead, the controller 225 may instruct the computing system 205 to modify the observed generation ID stored by the computing system 205 to match the value of the generation ID stored by the computing system 205 based on the DMS 210 successfully updating to match the value of the generation ID stored by the computing system 205.

The computing system 205 may thereby automatically synchronize with the DMS 210 based on (e.g., in response to) any changes to sets of backup parameters at the computing system 205. The controller 225 may monitor a value of an observed generation ID stored by the computing system 205 (e.g., an API server) to monitor whether the computing system 205 has synchronized with the DMS 210 or not.

At 260, the DMS user 215-*a* (e.g., via a computing device 115) may transmit, to the DMS 210 via a user interface associated with the DMS 210, a request to modify or create a set of backup parameters. At 265, if the request is to create a new set of backup parameters, the DMS 210 may create the new set of backup parameters. The DMS may set a generation ID associated with the new set of backup parameters to a default value (e.g., zero, one, or some other initial value) at the DMS 210. If the request is to modify an existing set of backup parameters, the DMS 210 may modify a state of the set of backup parameters as stored by the DMS 210. For example, the DMS 210 may change one or more parameters in the set. The generation ID may be handled by the computing system 205. Thus, the DMS 210 may refrain from incrementing or otherwise modifying the value of the generation ID associated with the set of backup parameters based on modifying the state of the set of backup parameters. At 270, the DMS 210 may transmit an acknowledgment back to the DMS user 215-*a* to indicate that the request was received and the set of backup parameters was modified successfully.

The DMS 210 may not automatically push an indication of the change to the computing system 205. Instead, the DMS 210 may maintain the set of backup parameters at the DMS 210 for at least a time period until the DMS 210 performs a periodic synchronization job or the DMS 210 receives a synchronization message from the computing system 205 (whichever even occurs first). If the DMS 210 receives a synchronization message from the computing system 205 before a next synchronization job, the synchronization message will indicate a new state and generation ID value for the DMS 210 to record, and the set of backup parameters will be synchronized with the computing system 205 again.

At 275, the DMS 210 may perform a synchronization job to synchronize with the computing system 205. The DMS 210 may perform the synchronization job periodically or at some defined time interval to reconcile the state of one or more sets of backup parameters at the DMS 210 and the computing system 205.

At 280, as part of the synchronization job, the DMS 210 may obtain a first state of the set of backup parameters as stored by the computing system 205 and a value of a first generation ID associated with the set of backup parameters as stored by the computing system 205. The DMS 210 may fetch one or more sets of backup parameters from the computing system 205, for example, by accessing the API 220. The API 220 may in turn communicate (e.g., synchronize with) the controller 225, based on communications between the API 220 and the computing system 205.

At 285, as part of the synchronization job, the DMS 210 may reconcile the sets of backup parameters as stored by the DMS 210 and the computing system 205. For example, the DMS 210 may compare the first state of the set of backup parameters as stored by the computing system 205 with a second state of the set of backup parameters as stored by the DMS 210. A state of a set of backup parameters may represent the types of backup parameters included in the set, values of the backup parameters, a quantity of backup parameters, or the like. Accordingly, if any one or more parameters have been modified at either the DMS 210 or the computing system 205 since a most recent synchronization message or synchronization job, the first state of the set of backup parameters may not match the second state of the set of backup parameters. The DMS 210 may additionally, or alternatively, compare the value of the first generation ID as stored by the computing system 205 with a value of a second generation ID associated with the second state of the set of backup parameters as stored by the DMS 210. The value of the first generation ID may be greater than or equal to the value of the second generation ID, as the computing system 205 may increment the value of the generation ID and the DMS 210 may not.

The DMS 210 may determine whether to modify the set of backup parameters as stored by the DMS 210, the value of the second generation ID of the set of backup parameters as stored by the DMS 210, or both based on the comparing. Additionally, or alternatively, the DMS 210 may determine whether to modify the set of backup parameters as stored by the computing system 205 based on the comparing. Various example states and generation ID value combinations that may be identified during a synchronization job, along with resulting modifications, are described in further detail elsewhere herein, including with reference to FIG. 3.

In some examples, as part of the synchronization job, the DMS 210 may modify the set of backup parameters as stored by the DMS 210 to match the first state of the set of backup parameters as stored by the computing system 205. Additionally, or alternatively, the DMS 210 may modify the value of the second generation ID as stored by the DMS 210 to match the value of the first generation ID as stored by the computing system 205.

In some examples, at 290, the DMS 210 may transmit a request to the computing system 205 (e.g., to the API 220). The request may be transmitted via the API 220 or some other interface associated with the computing system 205. The request may be for the computing system 205 to modify the set of backup parameters as stored by the computing system 205 to match the second state of the set of backup parameters as stored by the DMS 210. For example, if the first state and the second state are different, but the values of the first and second generation IDs are the same, this may indicate that the DMS 210 made a more recent change to the set of backup parameters, and the DMS 210 may request the computing system 205 to update accordingly.

At 295, in some examples, the API 220 and the controller 225 may synchronize based on any request received from the DMS 210. For example, if the synchronization job includes a request for the computing system 205 to update a state of the set of backup parameters to match the second state of the set of backup parameters as stored by the DMS 210, the API 220 may update the set and may increment the value of the first generation ID based on updating the set of backup parameters. The API 220 may indicate the change in the generation ID to the controller 225. The observed generation ID stored by the computing system 205 may now be different than the updated value of the first generation ID. The controller 225 may thereby request that the API 220 push the change to the DMS 210.

The DMS 210 may thereby dynamically perform one or more synchronization jobs to synchronize with the computing system 205. If the synchronization job identifies any differences between the state of the set of backup parameters or the values of the generation IDs as stored by the DMS 210 and the computing system 205, the synchronization job may update the state, the value of the first generation ID, or both as stored by the DMS 210, or may request the computing system 205 to update the state, the value of the second generation ID, or both as stored by the computing system 205.

If the synchronization job requests for the computing system 205 to make any changes to the state of the set of backup parameters, the computing system 205 may update the state and may automatically update the value of the second generation ID as stored by the computing system 205 in response to the update. Accordingly, any updates that the DMS 210 requests be made at the computing system 205 may improve synchronization of the states of the set of backup parameters, but may make the values of the generation IDs be out of sync.

Accordingly, if the synchronization job requests for an update to the state of the set of backup parameters as stored by the computing system 205, the computing system 205 may subsequently transmit a synchronization message back to the DMS 210. For example, the controller 225 may identify a difference between the value of the generation ID and a value of the observed generation ID as stored by the computing system 205 (e.g., as stored by the API 220), and may transmit, directly (e.g., not via the API 220), a synchronization message to the DMS 210 to request the DMS 210 to update the value of the generation ID as stored by the DMS 210. The DMS 210 may make the updates based on the request and may transmit a status indication accordingly. The synchronization jobs performed by the DMS 210 may thereby lead to additional synchronization steps, in some examples.

The DMS 210 and the computing system 205 may thereby maintain synchronization of a set of backup parameters by tracking any changes via a generation ID, automatically pushing changes from the computing system 205 to the DMS 210, and performing periodic synchronization jobs to reconcile other changes and differences between the DMS 210 and the computing system 205. In some examples, a connection between the DMS 210 and the controller 225 may be lost or otherwise disrupted for a time period, such that one or more synchronization messages transmitted from the computing system 205 (e.g., the controller 225) to the DMS 210 may be lost or otherwise not received. However, the DMS 210 may maintain synchronization via the periodic synchronization jobs, which may directly access the API 220 even without connection.

In some examples, the DMS 210 may refrain from performing the synchronization jobs, and the computing system 205 may perform all updates and may initiate synchronization via synchronization messages transmitted to the DMS 210. Such techniques may support serialization of the changes over time and may reduce overhead associated with the synchronization job. However, if a connection is disrupted between the DMS 210 and the controller 225, such techniques may introduce increased latency or may result in the DMS 210 not being up-to-date, the DMS 210 missing snapshots, or any combination thereof as compared with systems in which the DMS 210 performs a synchronization job.

In some other examples, the computing system 205 may not include a controller 225, or the controller 225 may not participate in the backup resource synchronization. In such cases, the DMS 210 may perform the synchronization via periodic synchronization jobs without synchronization messages from the computing system 205. Such techniques may reduce potential connectivity issues, as the DMS 210 may interface directly with the API 220 (e.g., no controller 225) and may be associated with less processing, in some examples. However, such techniques may additionally, or alternatively, increase latency as compared with systems in which inline synchronization messages are used.

Although the flow diagram 200 illustrates performance of a computing system synchronization first, followed by a synchronization job by the DMS 210, it is to be understood that the computing system synchronization and the synchronization jobs by the DMS 210 may be performed in any order and at any time. For example, the synchronization job by the DMS 210 may be performed periodically or at some set time interval, and the computing system 205 may transmit a synchronization message in response to any change made by the computing system user 215-*b* (e.g., if there is a proper connection between the computing system 205 and the DMS 210). The DMS 210 and the computing system 205 may continue to perform synchronization jobs and transmit synchronization messages, respectively, over time to maintain synchronization. Example synchronization states and actions are described in further detail elsewhere herein, including with reference to FIG. 3.

FIG. 3 shows an example of a synchronization state table 300 that supports generation-based protection set synchronization in accordance with aspects of the present disclosure. The synchronization state table 300 may implement or be implemented by aspects of FIGS. 1 and 2. For example, the synchronization state table 300 illustrates a set of candidate state configurations for a set of backup parameters at a DMS and at a computing system, which may represent examples of the DMS 110 and 210 or the computing system 105 and 205 as described with reference to FIGS. 1 and 2.

As described with reference to FIG. 2, the DMS may perform a synchronization operation to synchronize a set of backup parameters as stored by the DMS with a set of backup parameters as stored by the computing system. The DMS may first obtain (e.g., retrieve) information associated with a state of the set of backup parameters as stored by the computing system, represented by the computing system state 310 in FIG. 3 and a value of a first generation ID associated with the set of backup parameters as stored by the computing system, represented by the computing system generation ID 320 in FIG. 3. The DMS may compare the computing system state 310 with a state of the set of backup parameters as stored by the DMS, represented by the DMS state 305 in FIG. 3. The DMS may compare the computing system generation ID 320 with a value of a second generation ID associated with the set of backup parameters as stored by the DMS, represented by the DMS generation ID 315.

The synchronization state table 300 illustrates example combinations of the DMS state 305, the computing system state 310, the DMS generation ID 315, and the computing system generation ID 320 that could be observed during a DMS synchronization operation. It is to be understood that the values of X and Y are variables that represent potential values, and the various states and IDs may be represented by any variety of value, quantity, sequence, parameters, or any combination thereof. The value X may be understood to be different than the value X' and the value Y as described herein.

An example synchronization state combination may include the DMS state 305 being a first state, X, and the computing system state 310 being a second state, X', that is different than the first state. That is, a first state of the set of backup parameters as stored by the computing system may include one or more parameters that are different or otherwise set to different values than one or more parameters in the second state of the set of backup parameters as stored by the DMS. In this case, if a of the DMS generation ID 315, n, is different than a value of the computing system generation ID 320, n+1, the DMS may determine to modify the set of backup parameters as stored by the DMS such that the DMS state 305 matches the computing system state 310 (X') and the value of the DMS generation ID 315 matches the value of the computing system generation ID 320 (n+1). For example, the DMS may determine that the computing system modified the set of backup parameters based on a request from a user or some other trigger, incremented the generation ID value accordingly, but did not yet synchronize with the DMS, so the DMS may determine to synchronize with the computing system accordingly.

If the DMS state 305 and the computing system state 310 are different, and the values of the DMS generation ID 315 and the computing system generation ID 320 are the same (e.g., n), as shown in the second row of the synchronization state table 300, the DMS may determine that the computing system is out of sync with the DMS, and the DMS may transmit a request for the computing system to update the computing system state 310 to match the DMS state 305 accordingly. That is, because the DMS may not modify a value of the DMS generation ID 315 without any request or trigger from the computing system, if the generation IDs are the same and the states are different, it may be assumed that the DMS has updated one or more parameters in the set of backup parameters as stored by the DMS and has not yet propagated the change to the computing system. The computing system may thereby update the one or more parameters such that the computing system state 310 matches the DMS state 305 (e.g., X) based on the request from the DMS.

In some examples, if the DMS sends a request for the computing system to update the computing system state 310 to match the DMS state 305, the computing system may make the update and the value of the computing system generation ID 320 may automatically be updated at the computing system in response to the change. In such cases, an example state combination as shown in the fourth row of the synchronization state table 300 may occur, in which the DMS state 305 and the computing system state 310 may be the same, but the value of the computing system generation ID 320 may be greater than the value of the DMS generation ID 315. As such, the controller (e.g., the controller 225 as discussed in FIG. 2) of the computing system may detect a difference between an observed generation ID, which may represent a most recent value of the DMS generation ID 315, and the value of the computing system generation ID 320. The controller may transmit, via an API in response to detecting the difference, a synchronization message that requests the DMS to modify the backup parameters at the DMS based on the change. For example, the synchronization message may indicate the computing system state 310 and the value of the computing system generation ID 320, and the DMS may update the value of the DMS generation ID 315 to match the value of the computing system generation ID. The DMS state 305 and the computing system state 310 may thereby be the same (e.g., X), and the values of the DMS generation ID 315 and the computing system generation ID may be the same (e.g., n+1).

As described herein, the computing system may be the entity that increments the generation ID values, and the value of the DMS generation ID 315 may be a copy of the observed generation ID maintained by the computing system. That is, each time the computing system changes or modifies the set of backup parameters (e.g., the computing system state 310), the computing system may increment the value of the computing system generation ID 320. As described with reference to FIG. 2, a computing system may maintain an observed generation ID that represents a most recent generation ID recorded by the DMS, and the computing system may initiate a synchronization when a controller detects a difference between the observed generation ID and the value of the computing system generation ID 320. Thus, the value of the DMS generation ID 315 may not be greater than the value of the computing system generation ID 320, as illustrated in the third row of the synchronization state table 300, except for in some delete scenarios.

In some examples, the computing system may receive a request from a user of the computing system to delete a backup parameter set, but the backup parameter set may be locked such that deletion at the computing system is precluded. The computing system may receive the delete request and transmit a request to the DMS that requests the DMS to delete the set of backup parameters. The DMS may delete the set of backup parameters based on the request and may send an indication that the set of backup parameters were successfully deleted by the DMS. The indication may remove the lock from the computing system, such that the computing system may delete the set of backup parameters. Such techniques may ensure that the DMS is aware of any deletes initiated at the computing system.

In some examples, however, a user or other administrator may request a forced delete of a set of backup parameters. The forced delete may be performed by the computing system without any notice to the DMS. Additionally, or alternatively, the connection between the DMS and the computing system may be relatively poor, such that any indication of the delete may not be exchanged. In such cases, the computing system may reset the computing system generation ID 320 to a default initial value (e.g., zero, one, or some other default value that represents a reset) for the set of backup parameters. During a next synchronization job performed by the DMS, the DMS may observe the combination of synchronization states illustrated in the third row of the synchronization state table 300, in which there may or may not be a valid computing system state 310 that may or may not be the same as the DMS state 305, and the value of the DMS generation ID 315 may be greater than the value of the computing system generation ID 320. In this example, the DMS may determine whether the computing system generation ID 320 is set to the default initial value. If the value of the computing system generation ID 320 is the default value, the DMS may determine that the computing system deleted and reset the set of backup parameters, and the DMS may update the DMS state 305 and the DMS generation ID 315 to match.

The DMS may thereby perform a synchronization job periodically or at some defined time interval to synchronize with the computing system. As part of the synchronization job, the DMS may compare a DMS state 305 with a computing system state 310 and a value of a DMS generation ID 315 with a value of a computing system generation ID 320 to identify one or more of the state combinations illustrated in the synchronization state table 300. The DMS may modify the DMS state 305, modify the value of the DMS generation ID 315, or transmit a request for the computing system to modify the computing system state 310 based on the comparisons, which may ensure that the backup parameters are synchronized between the DMS and the computing system even though one or more users may change the backup set via one or both of the DMS and the computing system.

Figure 4:
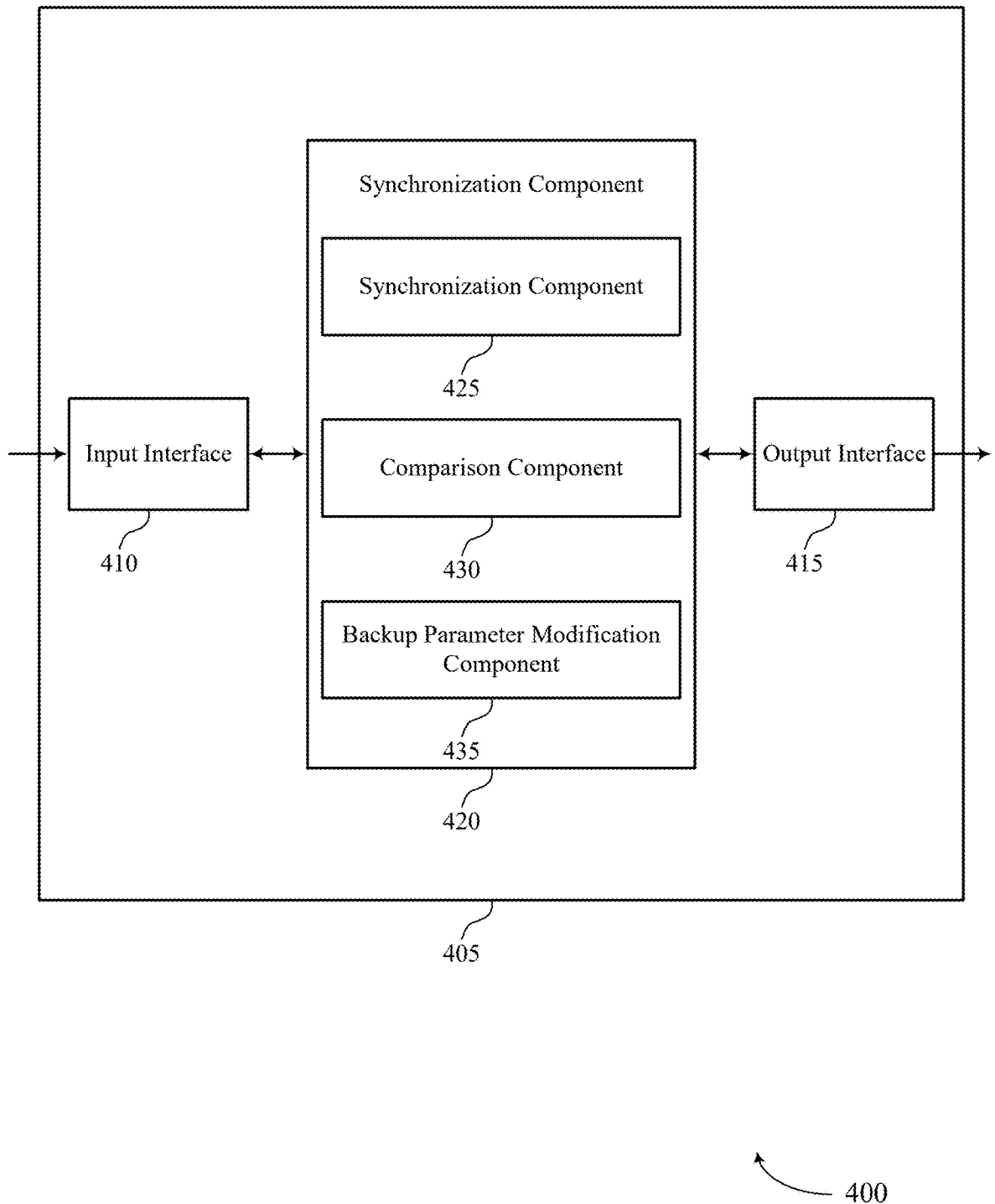
FIG. 4 shows a block diagram of an apparatus that supports generation-based protection set synchronization in accordance with aspects of the present disclosure.

FIG. 4 shows a block diagram 400 of a system 405 that supports generation-based protection set synchronization in accordance with aspects of the present disclosure. In some examples, the system 405 may be an example of aspects of one or more components described with reference to FIG. 1, such as a DMS 110. The system 405 may include an input interface 410, an output interface 415, and a synchronization component 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the synchronization component 420 to support generation-based protection set synchronization. In some cases, the input interface 410 may be a component of a network interface 625 as described with reference to FIG. 6.

The output interface 415 may manage output signaling for the system 405. For example, the output interface 415 may receive signaling from other components of the system 405, such as the synchronization component 420, and may transmit such output signaling corresponding to (e.g., representative of or otherwise based on) such signaling to other systems or devices. In some cases, the output interface 415 may be a component of a network interface 625 as described with reference to FIG. 6.

For example, the synchronization component 420 may include a synchronization component 425, a comparison component 430, a backup parameter modification component 435, or any combination thereof. In some examples, the synchronization component 420, or various components thereof, may be configured to perform various operations (e.g., receiving, monitoring, transmitting) using or otherwise in cooperation with the input interface 410, the output interface 415, or both. For example, the synchronization component 420 may receive information from the input interface 410, send information to the output interface 415, or be integrated in combination with the input interface 410, the output interface 415, or both to receive information, transmit information, or perform various other operations as described herein.

The synchronization component 425 may be configured as or otherwise support a means for obtaining, by a DMS and from a computing system via an interface associated with the computing system, a first state of a set of backup parameters as stored by the computing system and a value of a first generation ID associated with the set of backup parameters as stored by the computing system, where the set of backup parameters is associated with backups, by the DMS, of data stored by the computing system. The comparison component 430 may be configured as or otherwise support a means for comparing, by the DMS, the first state of the set of backup parameters as stored by the computing system with a second state of the set of backup parameters as stored by the DMS. The comparison component 430 may be configured as or otherwise support a means for comparing, by the DMS, the value of the first generation ID associated with the set of backup parameters as stored by the computing system with a value of a second generation ID associated with the set of backup parameters as stored by the DMS. The backup parameter modification component 435 may be configured as or otherwise support a means for determining whether to modify the set of backup parameters as stored by the DMS, the second generation ID of the set of backup parameters as stored by the DMS, or both based on comparing the first state with the second state and based on comparing the value of the first generation ID with the value of the second generation ID.

Figure 5:
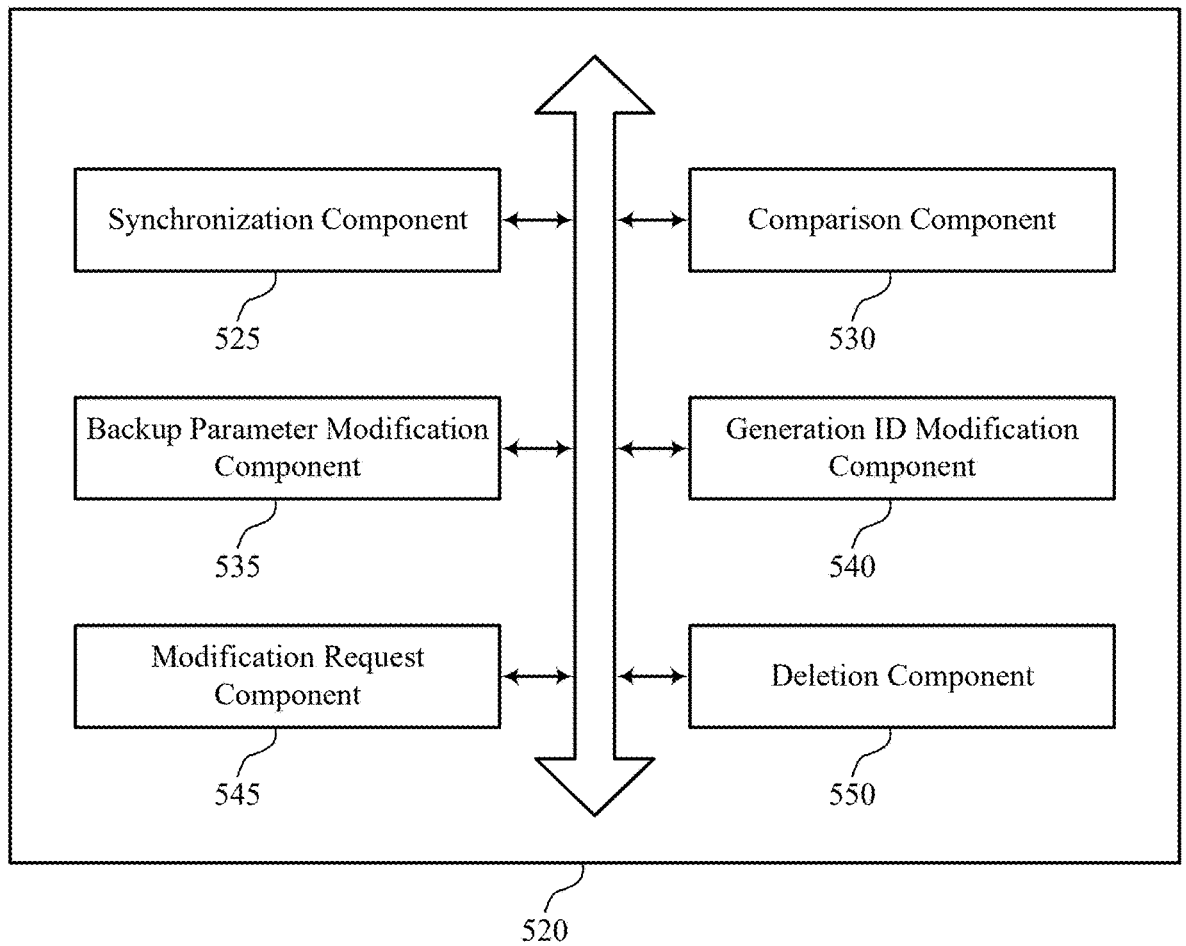
FIG. 5 shows a block diagram of a synchronization component that supports generation-based protection set synchronization in accordance with aspects of the present disclosure.

FIG. 5 shows a block diagram 500 of a synchronization component 520 that supports generation-based protection set synchronization in accordance with aspects of the present disclosure. The synchronization component 520 may be an example of aspects of a synchronization component or a synchronization component 420, or both, as described herein. The synchronization component 520, or various components thereof, may be an example of means for performing various aspects of generation-based protection set synchronization as described herein. For example, the synchronization component 520 may include a synchronization component 525, a comparison component 530, a backup parameter modification component 535, a generation ID modification component 540, a modification request component 545, a deletion component 550, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The synchronization component 525 may be configured as or otherwise support a means for obtaining, by a DMS and from a computing system via an interface associated with the computing system, a first state of a set of backup parameters as stored by the computing system and a value of a first generation ID associated with the set of backup parameters as stored by the computing system, where the set of backup parameters is associated with backups, by the DMS, of data stored by the computing system. The comparison component 530 may be configured as or otherwise support a means for comparing, by the DMS, the first state of the set of backup parameters as stored by the computing system with a second state of the set of backup parameters as stored by the DMS. In some examples, the comparison component 530 may be configured as or otherwise support a means for comparing, by the DMS, the value of the first generation ID associated with the set of backup parameters as stored by the computing system with a value of a second generation ID associated with the set of backup parameters as stored by the DMS. The backup parameter modification component 535 may be configured as or otherwise support a means for determining whether to modify the set of backup parameters as stored by the DMS, the second generation ID of the set of backup parameters as stored by the DMS, or both based on comparing the first state with the second state and based on comparing the value of the first generation ID with the value of the second generation ID.

In some examples, the backup parameter modification component 535 may be configured as or otherwise support a means for modifying, by the DMS based on the determining, the set of backup parameters as stored by the DMS to match the first state of the set of backup parameters as stored by the computing system, where the determining includes determining to modify the set of backup parameters as stored by the DMS based on the first state of the set of backup parameters being different than the second state of the set of backup parameters.

In some examples, the generation ID modification component 540 may be configured as or otherwise support a means for modifying, by the DMS based on the determining, the value of the second generation ID associated with the set of backup parameters as stored by the DMS to match the value of the first generation ID associated with the set of backup parameters as stored by the computing system, where the determining includes determining to modify the value of the second generation ID based on the value of the first generation ID being different than the value of the second generation ID.

In some examples, the modification request component 545 may be configured as or otherwise support a means for transmitting, by the DMS and via the interface associated with the computing system, a request for the computing system to modify the set of backup parameters as stored by the computing system to match the second state of the set of backup parameters as stored by the DMS, where the request is based on the first state of the set of backup parameters and the second state of the set of backup parameters being different and further based on the value of the first generation ID and the value of the second generation ID being the same.

In some examples, the synchronization component 525 may be configured as or otherwise support a means for receiving, at the DMS via the interface associated with the computing system, a synchronization message that indicates a change of the value of the first generation ID to an updated value associated with the second state of the set of backup parameters as stored by the computing system. In some examples, the generation ID modification component 540 may be configured as or otherwise support a means for modifying, by the DMS based on the synchronization message, the value of the second generation ID to match the updated value of the first generation ID.

In some examples, the synchronization component 525 may be configured as or otherwise support a means for executing, by the DMS at a first time associated with a synchronization periodicity, a first synchronization job for synchronization of backup parameters between the DMS and the computing system, where transmitting the request is based on the first synchronization job. In some examples, the synchronization component 525 may be configured as or otherwise support a means for executing, by the DMS at a second time associated with the synchronization periodicity, a second synchronization job for the synchronization of the backup parameters between the DMS and the computing system, where the second time is after transmission of the request for the computing system to modify the set of backup parameters as stored by the computing system. In some examples, to execute the second synchronization job, the synchronization component 525 may be configured as or otherwise support a means for obtaining, by the DMS and from the computing system via the interface associated with the computing system, an updated value of the first generation ID that is associated with the second state of the set of backup parameters as stored by the computing system, and the generation ID modification component 540 may be configured as or otherwise support a means for modifying the value of the second generation ID stored by the DMS to match the updated value of the first generation ID based on the updated value of the first generation ID being different than the value of the second generation ID, where the updated value of the first generation ID is based on modification of the set of backup parameters as stored by the computing system in response to the request.

In some examples, the modification request component 545 may be configured as or otherwise support a means for receiving, at the DMS and via a user interface, a request to modify the set of backup parameters as stored by the DMS. In some examples, the backup parameter modification component 535 may be configured as or otherwise support a means for modifying the set of backup parameters from a third state or the first state to the second state, where the second state of the set of backup parameters is different than the first state of the set of backup parameters based on the modifying of the set of backup parameters to the second state. In some examples, the generation ID modification component 540 may be configured as or otherwise support a means for maintaining, after modifying the set of backup parameters, the second generation ID for a time period until execution, by the DMS, of a periodic synchronization job for synchronization of backup parameters across the DMS and the computing system.

In some examples, the modification request component 545 may be configured as or otherwise support a means for receiving, at the DMS via the interface associated with the computing system, a request to delete the set of backup parameters. In some examples, the deletion component 550 may be configured as or otherwise support a means for deleting, by the DMS based on the request, the set of backup parameters. In some examples, the synchronization component 525 may be configured as or otherwise support a means for transmitting, to the computing system via the interface, an indication that the set of backup parameters is deleted at the DMS, where the indication unlocks the set of backup parameters for deletion at the computing system.

In some examples, the comparison component 530 may be configured as or otherwise support a means for determining, based on the value of the second generation ID being greater than the value of the first generation ID, that the value of the first generation ID includes a default value associated with a reset of the set of backup parameters as stored by the computing system. In some examples, the backup parameter modification component 535 may be configured as or otherwise support a means for modifying, by the DMS based on determining that the value of the first generation ID includes the default value, the set of backup parameters as stored by the DMS to match the first state of the set of backup parameters as stored by the computing system. In some examples, the generation ID modification component 540 may be configured as or otherwise support a means for modifying, by the DMS based on determining that the value of the first generation ID includes the default value, the value of the second generation ID associated with the set of backup parameters as stored by the DMS to match the value of the first generation ID associated with the set of backup parameters as stored by the computing system.

In some examples, the synchronization component 525 may be configured as or otherwise support a means for executing, by the DMS in accordance with a synchronization periodicity, a synchronization job for synchronization of backup parameters across the DMS and the computing system, where obtaining the first state of the set of backup parameters and the value of the first generation ID is based on the synchronization job.

In some examples, to support obtaining the first state of the set of backup parameters and the first generation ID, the synchronization component 525 may be configured as or otherwise support a means for receiving, at the DMS via the interface associated with the computing system, a synchronization message that indicates the first state and the value of the first generation ID, where the synchronization message is based on a change in the first state, a change in the value of the first generation ID, or both at the computing system.

In some examples, the set of backup parameters includes IDs of a set of multiple computing resources to be backed up by the DMS, one or more types associated with the set of multiple computing resources, one or more labels associated with the set of multiple computing resources, one or more names associated with the set of multiple computing resources, one or more timing parameters associated with the backups by the DMS, a service level agreement associated with the set of multiple computing resources, one or more workload resources associated with backups by the DMS, or any combination thereof.

Figure 6:
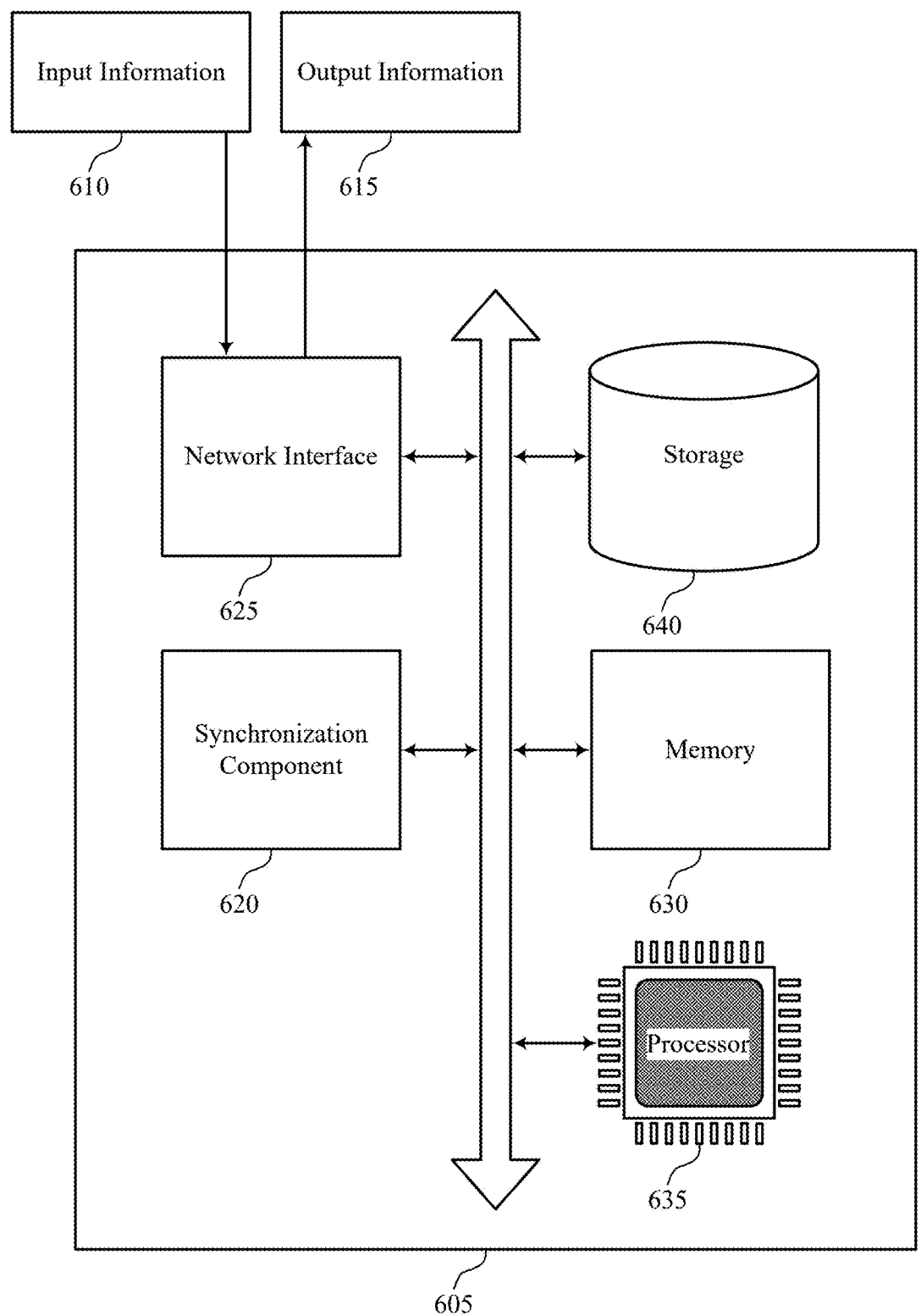
FIG. 6 shows a diagram of a system including a device that supports generation-based protection set synchronization in accordance with aspects of the present disclosure.

FIG. 6 shows a block diagram 600 of a system 605 that supports generation-based protection set synchronization in accordance with aspects of the present disclosure. The system 605 may be an example of or include components of a system 405 as described herein. The system 605 may include components for data management, including components such as a synchronization component 620, an input information 610, an output information 615, a network interface 625, at least one memory 630, at least one processor 635, and a storage 640. These components may be in electronic communication or otherwise coupled with each other (e.g., operatively, communicatively, functionally, electronically, electrically; via one or more buses, communications links, communications interfaces, or any combination thereof). Additionally, the components of the system 605 may include corresponding physical components or may be implemented as corresponding virtual components (e.g., components of one or more virtual machines). In some examples, the system 605 may be an example of aspects of one or more components described with reference to FIG. 1, such as a DMS 110.

The network interface 625 may enable the system 605 to exchange information (e.g., input information 610, output information 615, or both) with other systems or devices (not shown). For example, the network interface 625 may enable the system 605 to connect to a network (e.g., a network 120 as described herein). The network interface 625 may include one or more wireless network interfaces, one or more wired network interfaces, or any combination thereof. In some examples, the network interface 625 may be an example of may be an example of aspects of one or more components described with reference to FIG. 1, such as one or more network interfaces 165.

Memory 630 may include RAM, ROM, or both. The memory 630 may store computer-readable, computer-executable software including instructions that, when executed, cause the processor 635 to perform various functions described herein. In some cases, the memory 630 may contain, among other things, a basic input/output system (BIOS), which may control basic hardware or software operation such as the interaction with peripheral components or devices. In some cases, the memory 630 may be an example of aspects of one or more components described with reference to FIG. 1, such as one or more memories 175.

The processor 635 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 635 may be configured to execute computer-readable instructions stored in a memory 630 to perform various functions (e.g., functions or tasks supporting generation-based protection set synchronization). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635. In some cases, the processor 635 may be an example of aspects of one or more components described with reference to FIG. 1, such as one or more processors 170.

Storage 640 may be configured to store data that is generated, processed, stored, or otherwise used by the system 605. In some cases, the storage 640 may include one or more HDDs, one or more SDDs, or both. In some examples, the storage 640 may be an example of a single database, a distributed database, multiple distributed databases, a data store, a data lake, or an emergency backup database. In some examples, the storage 640 may be an example of one or more components described with reference to FIG. 1, such as one or more network disks 180.

For example, the synchronization component 620 may be configured as or otherwise support a means for obtaining, by a DMS and from a computing system via an interface associated with the computing system, a first state of a set of backup parameters as stored by the computing system and a value of a first generation ID associated with the set of backup parameters as stored by the computing system, where the set of backup parameters is associated with backups, by the DMS, of data stored by the computing system. The synchronization component 620 may be configured as or otherwise support a means for comparing, by the DMS, the first state of the set of backup parameters as stored by the computing system with a second state of the set of backup parameters as stored by the DMS. The synchronization component 620 may be configured as or otherwise support a means for comparing, by the DMS, the value of the first generation ID associated with the set of backup parameters as stored by the computing system with a value of a second generation ID associated with the set of backup parameters as stored by the DMS. The synchronization component 620 may be configured as or otherwise support a means for determining whether to modify the set of backup parameters as stored by the DMS, the second generation ID of the set of backup parameters as stored by the DMS, or both based on comparing the first state with the second state and based on comparing the value of the first generation ID with the value of the second generation ID.

By including or configuring the synchronization component 620 in accordance with examples as described herein, the system 605 may support techniques for generation-based protection set synchronization, which may provide one or more benefits such as, for example, improved reliability, reduced latency, more efficient utilization of computing resources, network resources or both, improved scalability, and improved security, among other possibilities.

Figure 7:
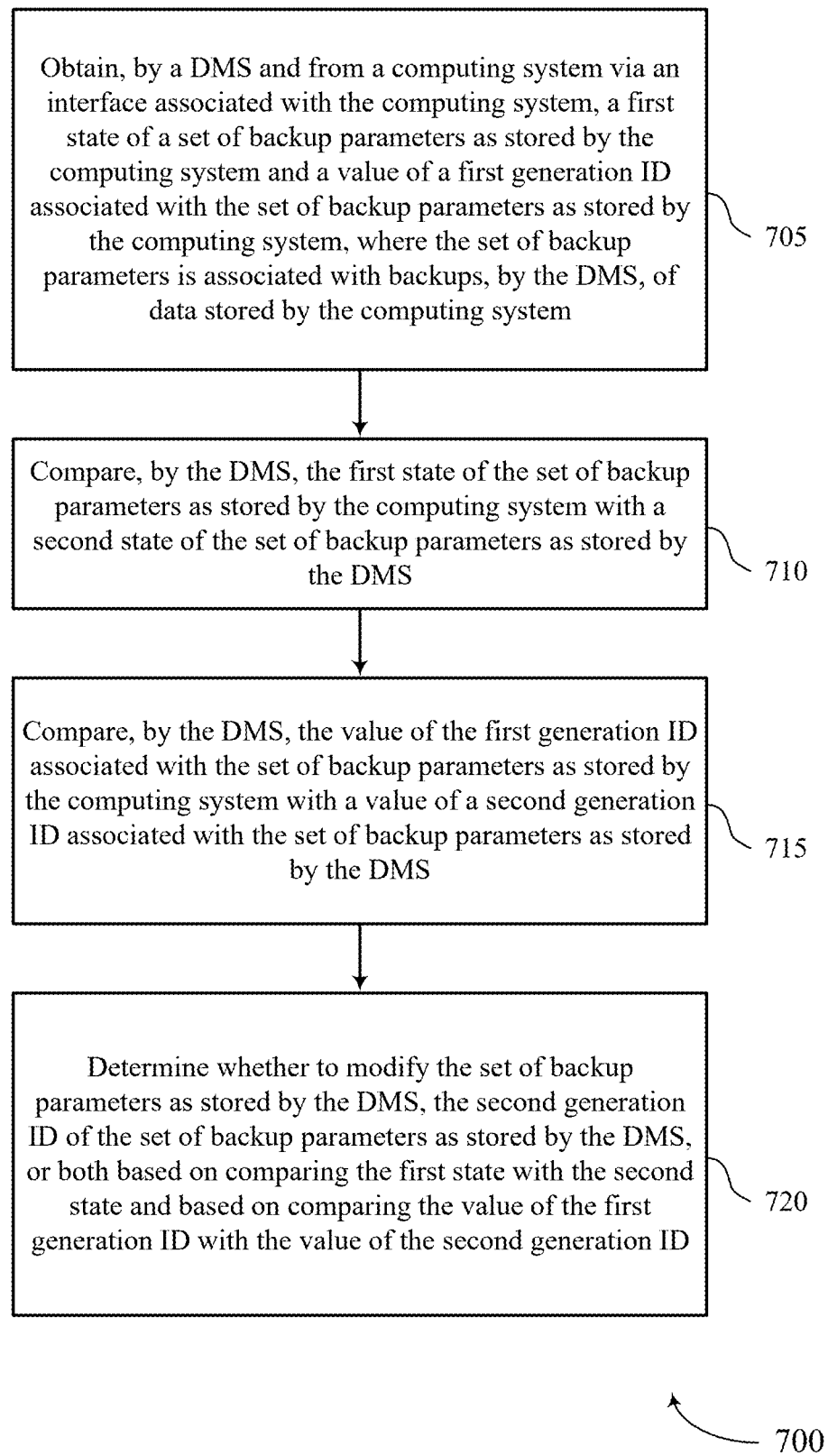
FIGS. 7 through 9 show flowcharts illustrating methods that support generation-based protection set synchronization in accordance with aspects of the present disclosure.

FIG. 7 shows a flowchart illustrating a method 700 that supports generation-based protection set synchronization in accordance with aspects of the present disclosure. The operations of the method 700 may be implemented by a DMS or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include obtaining, by a DMS and from a computing system via an interface associated with the computing system, a first state of a set of backup parameters as stored by the computing system and a value of a first generation ID associated with the set of backup parameters as stored by the computing system, where the set of backup parameters is associated with backups, by the DMS, of data stored by the computing system. The operations of 705 may be performed in accordance with examples as disclosed herein. In some examples, aspects of the operations of 705 may be performed by a synchronization component 525 as described with reference to FIG. 5.

At 710, the method may include comparing, by the DMS, the first state of the set of backup parameters as stored by the computing system with a second state of the set of backup parameters as stored by the DMS. The operations of 710 may be performed in accordance with examples as disclosed herein. In some examples, aspects of the operations of 710 may be performed by a comparison component 530 as described with reference to FIG. 5.

At 715, the method may include comparing, by the DMS, the value of the first generation ID associated with the set of backup parameters as stored by the computing system with a value of a second generation ID associated with the set of backup parameters as stored by the DMS. The operations of 715 may be performed in accordance with examples as disclosed herein. In some examples, aspects of the operations of 715 may be performed by a comparison component 530 as described with reference to FIG. 5.

At 720, the method may include determining whether to modify the set of backup parameters as stored by the DMS, the second generation ID of the set of backup parameters as stored by the DMS, or both based on comparing the first state with the second state and based on comparing the value of the first generation ID with the value of the second generation ID. The operations of 720 may be performed in accordance with examples as disclosed herein. In some examples, aspects of the operations of 720 may be performed by a backup parameter modification component 535 as described with reference to FIG. 5.

Figure 8:
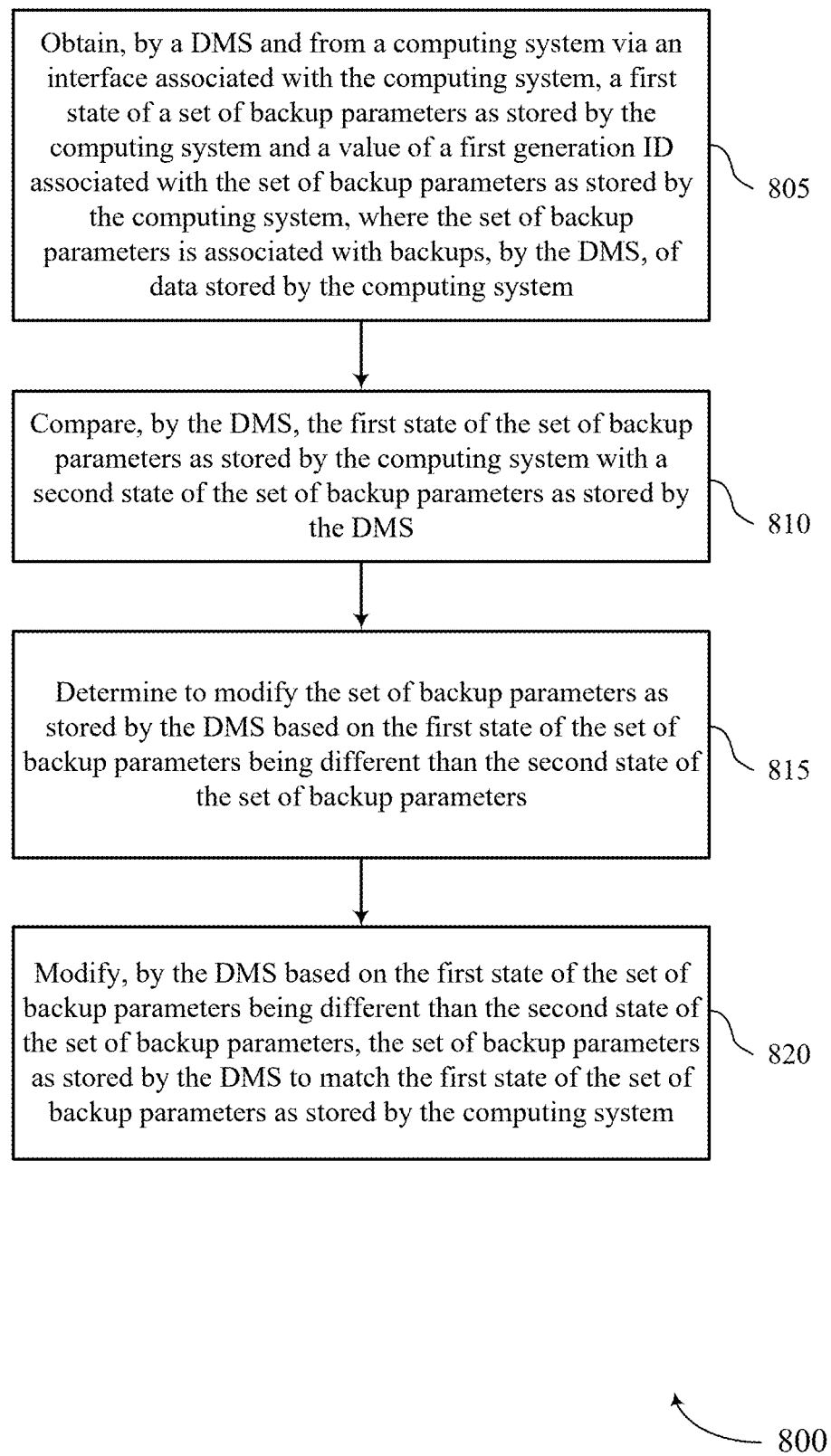

FIG. 8 shows a flowchart illustrating a method 800 that supports generation-based protection set synchronization in accordance with aspects of the present disclosure. The operations of the method 800 may be implemented by a DMS or its components as described herein. For example, the operations of the method 800 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 805, the method may include obtaining, by a DMS and from a computing system via an interface associated with the computing system, a first state of a set of backup parameters as stored by the computing system and a value of a first generation ID associated with the set of backup parameters as stored by the computing system, where the set of backup parameters is associated with backups, by the DMS, of data stored by the computing system. The operations of 805 may be performed in accordance with examples as disclosed herein. In some examples, aspects of the operations of 805 may be performed by a synchronization component 525 as described with reference to FIG. 5.

At 810, the method may include comparing, by the DMS, the first state of the set of backup parameters as stored by the computing system with a second state of the set of backup parameters as stored by the DMS. The operations of 810 may be performed in accordance with examples as disclosed herein. In some examples, aspects of the operations of 810 may be performed by a comparison component 530 as described with reference to FIG. 5.

At 815, the method may include determining to modify the set of backup parameters as stored by the DMS based on the first state of the set of backup parameters being different than the second state of the set of backup parameters. The operations of 815 may be performed in accordance with examples as disclosed herein. In some examples, aspects of the operations of 815 may be performed by a backup parameter modification component 535 as described with reference to FIG. 5.

At 820, the method may include modifying, by the DMS based on the first state of the set of backup parameters being different than the second state of the set of backup parameters, the set of backup parameters as stored by the DMS to match the first state of the set of backup parameters as stored by the computing system. The operations of 820 may be performed in accordance with examples as disclosed herein. In some examples, aspects of the operations of 820 may be performed by a backup parameter modification component 535 as described with reference to FIG. 5.

Figure 9:
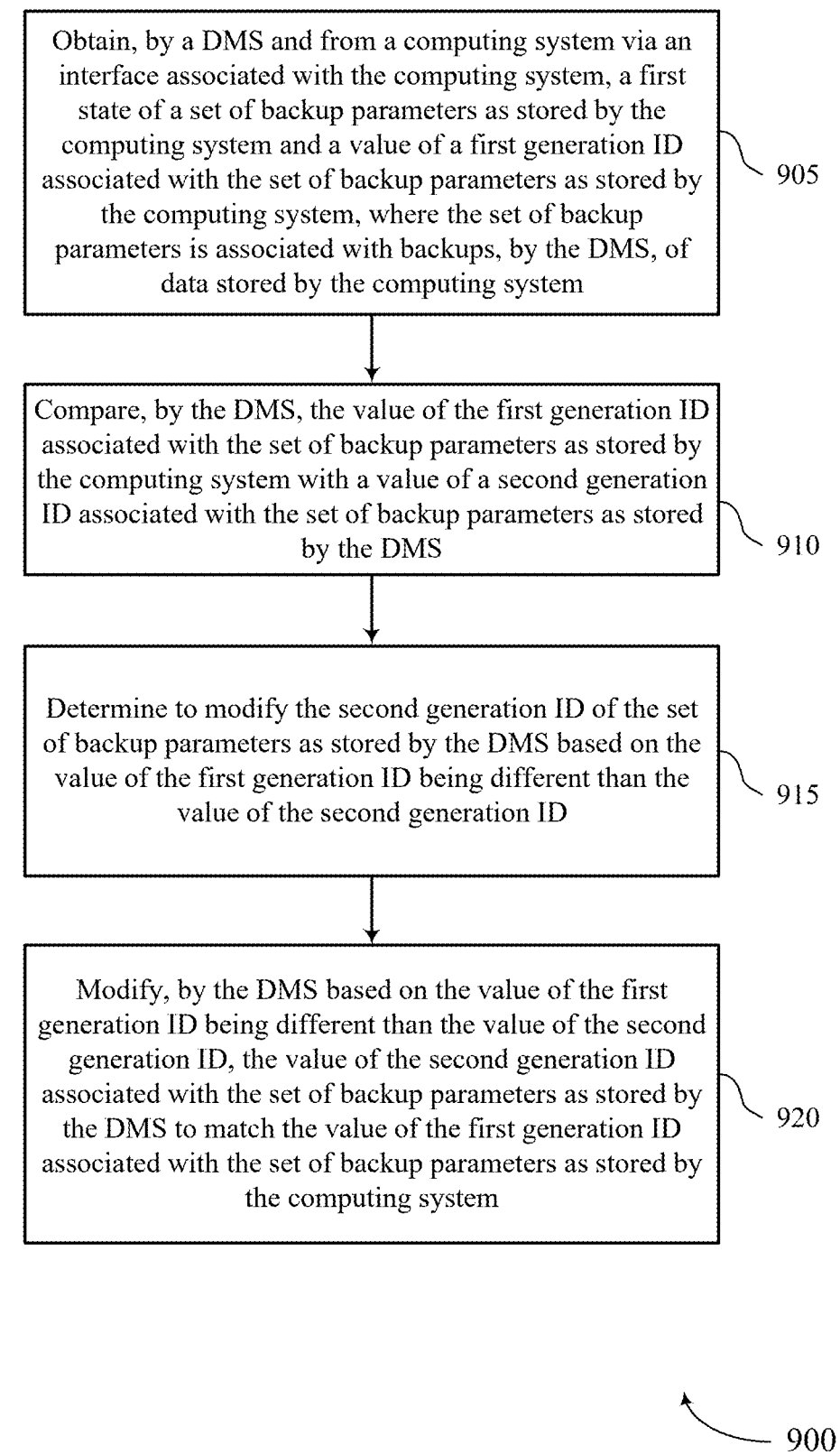

FIG. 9 shows a flowchart illustrating a method 900 that supports generation-based protection set synchronization in accordance with aspects of the present disclosure. The operations of the method 900 may be implemented by a DMS or its components as described herein. For example, the operations of the method 900 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 905, the method may include obtaining, by a DMS and from a computing system via an interface associated with the computing system, a first state of a set of backup parameters as stored by the computing system and a value of a first generation ID associated with the set of backup parameters as stored by the computing system, where the set of backup parameters is associated with backups, by the DMS, of data stored by the computing system. The operations of 905 may be performed in accordance with examples as disclosed herein. In some examples, aspects of the operations of 905 may be performed by a synchronization component 525 as described with reference to FIG. 5.

At 910, the method may include comparing, by the DMS, the value of the first generation ID associated with the set of backup parameters as stored by the computing system with a value of a second generation ID associated with the set of backup parameters as stored by the DMS. The operations of 910 may be performed in accordance with examples as disclosed herein. In some examples, aspects of the operations of 910 may be performed by a comparison component 530 as described with reference to FIG. 5.

At 915, the method may include determining to modify the second generation ID of the set of backup parameters as stored by the DMS based on the value of the first generation ID being different than the value of the second generation ID. The operations of 915 may be performed in accordance with examples as disclosed herein. In some examples, aspects of the operations of 915 may be performed by a backup parameter modification component 535 as described with reference to FIG. 5.

At 920, the method may include modifying, by the DMS based on the value of the first generation ID being different than the value of the second generation ID, the value of the second generation ID associated with the set of backup parameters as stored by the DMS to match the value of the first generation ID associated with the set of backup parameters as stored by the computing system. The operations of 920 may be performed in accordance with examples as disclosed herein. In some examples, aspects of the operations of 920 may be performed by a generation ID modification component 540 as described with reference to FIG. 5.

A method by an apparatus is described. The method may include obtaining, by a DMS and from a computing system via an interface associated with the computing system, a first state of a set of backup parameters as stored by the computing system and a value of a first generation ID associated with the set of backup parameters as stored by the computing system, where the set of backup parameters is associated with backups, by the DMS, of data stored by the computing system, comparing, by the DMS, the first state of the set of backup parameters as stored by the computing system with a second state of the set of backup parameters as stored by the DMS, comparing, by the DMS, the value of the first generation ID associated with the set of backup parameters as stored by the computing system with a value of a second generation ID associated with the set of backup parameters as stored by the DMS, and determining whether to modify the set of backup parameters as stored by the DMS, the second generation ID of the set of backup parameters as stored by the DMS, or both based on comparing the first state with the second state and based on comparing the value of the first generation ID with the value of the second generation ID.

An apparatus is described. The apparatus may include one or more memories storing processor executable code, and one or more processors coupled with the one or more memories. The one or more processors may individually or collectively be operable to execute the code to cause the apparatus to obtain, by a DMS and from a computing system via an interface associated with the computing system, a first state of a set of backup parameters as stored by the computing system and a value of a first generation ID associated with the set of backup parameters as stored by the computing system, where the set of backup parameters is associated with backups, by the DMS, of data stored by the computing system, compare, by the DMS, the first state of the set of backup parameters as stored by the computing system with a second state of the set of backup parameters as stored by the DMS, compare, by the DMS, the value of the first generation ID associated with the set of backup parameters as stored by the computing system with a value of a second generation ID associated with the set of backup parameters as stored by the DMS, and determine whether to modify the set of backup parameters as stored by the DMS, the second generation ID of the set of backup parameters as stored by the DMS, or both based on comparing the first state with the second state and based on comparing the value of the first generation ID with the value of the second generation ID.

Another apparatus is described. The apparatus may include means for obtaining, by a DMS and from a computing system via an interface associated with the computing system, a first state of a set of backup parameters as stored by the computing system and a value of a first generation ID associated with the set of backup parameters as stored by the computing system, where the set of backup parameters is associated with backups, by the DMS, of data stored by the computing system, means for comparing, by the DMS, the first state of the set of backup parameters as stored by the computing system with a second state of the set of backup parameters as stored by the DMS, means for comparing, by the DMS, the value of the first generation ID associated with the set of backup parameters as stored by the computing system with a value of a second generation ID associated with the set of backup parameters as stored by the DMS, and means for determining whether to modify the set of backup parameters as stored by the DMS, the second generation ID of the set of backup parameters as stored by the DMS, or both based on comparing the first state with the second state and based on comparing the value of the first generation ID with the value of the second generation ID.

A non-transitory computer-readable medium storing code is described. The code may include instructions executable by one or more processors to obtain, by a DMS and from a computing system via an interface associated with the computing system, a first state of a set of backup parameters as stored by the computing system and a value of a first generation ID associated with the set of backup parameters as stored by the computing system, where the set of backup parameters is associated with backups, by the DMS, of data stored by the computing system, compare, by the DMS, the first state of the set of backup parameters as stored by the computing system with a second state of the set of backup parameters as stored by the DMS, compare, by the DMS, the value of the first generation ID associated with the set of backup parameters as stored by the computing system with a value of a second generation ID associated with the set of backup parameters as stored by the DMS, and determine whether to modify the set of backup parameters as stored by the DMS, the second generation ID of the set of backup parameters as stored by the DMS, or both based on comparing the first state with the second state and based on comparing the value of the first generation ID with the value of the second generation ID.

Some examples of the method, apparatus, and non-transitory computer-readable medium described herein may further include operations, features, means, or instructions for modifying, by the DMS based on the first state of the set of backup parameters being different than the second state of the set of backup parameters, the set of backup parameters as stored by the DMS to match the first state of the set of backup parameters as stored by the computing system.

Some examples of the method, apparatus, and non-transitory computer-readable medium described herein may further include operations, features, means, or instructions for modifying, by the DMS based on the value of the first generation ID being different than the value of the second generation ID, the value of the second generation ID associated with the set of backup parameters as stored by the DMS to match the value of the first generation ID associated with the set of backup parameters as stored by the computing system.

Some examples of the method, apparatus, and non-transitory computer-readable medium described herein may further include operations, features, means, or instructions for transmitting, by the DMS and via the interface associated with the computing system, a request for the computing system to modify the set of backup parameters as stored by the computing system to match the second state of the set of backup parameters as stored by the DMS, where the request may be based on the first state of the set of backup parameters and the second state of the set of backup parameters being different and further based on the value of the first generation ID and the value of the second generation ID being the same.

Some examples of the method, apparatus, and non-transitory computer-readable medium described herein may further include operations, features, means, or instructions for receiving, at the DMS via the interface associated with the computing system, a synchronization message that indicates a change of the value of the first generation ID to an updated value associated with the second state of the set of backup parameters as stored by the computing system and modifying, by the DMS based on the synchronization message, the value of the second generation ID to match the updated value of the first generation ID.

Some examples of the method, apparatus, and non-transitory computer-readable medium described herein may further include operations, features, means, or instructions for executing, by the DMS at a first time associated with a synchronization periodicity, a first synchronization job for synchronization of backup parameters between the DMS and the computing system, where transmitting the request may be based on the first synchronization job and executing, by the DMS at a second time associated with the synchronization periodicity, a second synchronization job for the synchronization of the backup parameters between the DMS and the computing system, where the second time may be after transmission of the request for the computing system to modify the set of backup parameters as stored by the computing system. In some examples of the method, apparatus, and non-transitory computer-readable medium described herein, operations, features, means or instructions, for executing the second synchronization job may include operations, features, means or instructions, for obtaining, by the DMS and from the computing system via the interface associated with the computing system, an updated value of the first generation ID that is associated with the second state of the set of backup parameters as stored by the computing system and modifying the value of the second generation ID stored by the DMS to match the updated value of the first generation ID based on the updated value of the first generation ID being different than the value of the second generation ID, wherein the updated value of the first generation ID is based on modification of the set of backup parameters as stored by the computing system in response to the request.

Some examples of the method, apparatus, and non-transitory computer-readable medium described herein may further include operations, features, means, or instructions for receiving, at the DMS and via a user interface, a request to modify the set of backup parameters as stored by the DMS, modifying the set of backup parameters from a third state or the first state to the second state, where the second state of the set of backup parameters may be different than the first state of the set of backup parameters based on the modifying of the set of backup parameters to the second state, and maintaining, after modifying the set of backup parameters, the second generation ID for a time period until execution, by the DMS, of a periodic synchronization job for synchronization of backup parameters across the DMS and the computing system.

Some examples of the method, apparatus, and non-transitory computer-readable medium described herein may further include operations, features, means, or instructions for receiving, at the DMS via the interface associated with the computing system, a request to delete the set of backup parameters, deleting, by the DMS based on the request, the set of backup parameters, and transmitting, to the computing system via the interface, an indication that the set of backup parameters may be deleted at the DMS, where the indication unlocks the set of backup parameters for deletion at the computing system.

Some examples of the method, apparatus, and non-transitory computer-readable medium described herein may further include operations, features, means, or instructions for determining, based on the value of the second generation ID being greater than the value of the first generation ID, that the value of the first generation ID includes a default value associated with a reset of the set of backup parameters as stored by the computing system, modifying, by the DMS based on determining that the value of the first generation ID includes the default value, the set of backup parameters as stored by the DMS to match the first state of the set of backup parameters as stored by the computing system, and modifying, by the DMS based on determining that the value of the first generation ID includes the default value, the value of the second generation ID associated with the set of backup parameters as stored by the DMS to match the value of the first generation ID associated with the set of backup parameters as stored by the computing system.

Some examples of the method, apparatus, and non-transitory computer-readable medium described herein may further include operations, features, means, or instructions for executing, by the DMS in accordance with a synchronization periodicity, a synchronization job for synchronization of backup parameters across the DMS and the computing system, where obtaining the first state of the set of backup parameters and the value of the first generation ID may be based on the synchronization job.

In some examples of the method, apparatus, and non-transitory computer-readable medium described herein, operations, features, means, or instructions for obtaining the first state of the set of backup parameters and the first generation ID may include operations, features, means, or instructions for receiving, at the DMS via the interface associated with the computing system, a synchronization message that indicates the first state and the value of the first generation ID, where the synchronization message may be based on a change in the first state, a change in the value of the first generation ID, or both at the computing system.

In some examples of the method, apparatus, and non-transitory computer-readable medium described herein, the set of backup parameters includes IDs of a set of multiple computing resources to be backed up by the DMS, one or more types associated with the set of multiple computing resources, one or more labels associated with the set of multiple computing resources, one or more names associated with the set of multiple computing resources, one or more timing parameters associated with the backups by the DMS, a service level agreement associated with the set of multiple computing resources, one or more workload resources associated with backups by the DMS, or any combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   obtaining, by a data management system and from a computing system via an interface associated with the computing system, a first state of a set of backup parameters as stored by the computing system and a value of a first generation identifier associated with the set of backup parameters as stored by the computing system, wherein the set of backup parameters is associated with backups, by the data management system, of data stored by the computing system;
   comparing, by the data management system, the first state of the set of backup parameters as stored by the computing system with a second state of the set of backup parameters as stored by the data management system;
   comparing, by the data management system, the value of the first generation identifier associated with the set of backup parameters as stored by the computing system with a value of a second generation identifier associated with the set of backup parameters as stored by the data management system; and
   determining whether to modify the set of backup parameters as stored by the data management system, the second generation identifier of the set of backup parameters as stored by the data management system, or both based at least in part on comparing the first state with the second state and based at least in part on comparing the value of the first generation identifier with the value of the second generation identifier.

2. The method of claim 1, further comprising:
   modifying, by the data management system based at least in part on the first state of the set of backup parameters being different than the second state of the set of backup parameters, the set of backup parameters as stored by the data management system to match the first state of the set of backup parameters as stored by the computing system.

3. The method of claim 1, further comprising:
   modifying, by the data management system based at least in part on the value of the first generation identifier being different than the value of the second generation identifier, the value of the second generation identifier associated with the set of backup parameters as stored by the data management system to match the value of the first generation identifier associated with the set of backup parameters as stored by the computing system.

4. The method of claim 1, further comprising:
   transmitting, by the data management system and via the interface associated with the computing system, a request for the computing system to modify the set of backup parameters as stored by the computing system to match the second state of the set of backup parameters as stored by the data management system, wherein the request is based at least in part on the first state of the set of backup parameters and the second state of the set of backup parameters being different and further based at least in part on the value of the first generation identifier and the value of the second generation identifier being the same.

5. The method of claim 4, further comprising:
   receiving, at the data management system via the interface associated with the computing system, a synchronization message that indicates a change of the value of the first generation identifier to an updated value associated with the second state of the set of backup parameters as stored by the computing system; and
   modifying, by the data management system based at least in part on the synchronization message, the value of the second generation identifier to match the updated value of the first generation identifier.

6. The method of claim 4, further comprising:
   executing, by the data management system at a first time associated with a synchronization periodicity, a first synchronization job for synchronization of backup parameters between the data management system and the computing system, wherein transmitting the request is based at least in part on the first synchronization job; and
   executing, by the data management system at a second time associated with the synchronization periodicity, a second synchronization job for the synchronization of the backup parameters between the data management system and the computing system, wherein the second time is after transmission of the request for the computing system to modify the set of backup parameters as stored by the computing system, and wherein executing the second synchronization job comprises:
   obtaining, by the data management system and from the computing system via the interface associated with the computing system, an updated value of the first generation identifier that is associated with the second state of the set of backup parameters as stored by the computing system; and
   modifying the value of the second generation identifier stored by the data management system to match the updated value of the first generation identifier based at least in part on the updated value of the first generation identifier being different than the value of the second generation identifier, wherein the updated value of the first generation identifier is based at least in part on modification of the set of backup parameters as stored by the computing system in response to the request.

7. The method of claim 1, further comprising:
receiving, at the data management system and via a user interface, a request to modify the set of backup parameters as stored by the data management system;
modifying the set of backup parameters from a third state or the first state to the second state, wherein the second state of the set of backup parameters is different than the first state of the set of backup parameters based at least in part on the modifying of the set of backup parameters to the second state; and
maintaining, after modifying the set of backup parameters, the second generation identifier for a time period until execution, by the data management system, of a periodic synchronization job for synchronization of backup parameters across the data management system and the computing system.

8. The method of claim 1, further comprising:
receiving, at the data management system via the interface associated with the computing system, a request to delete the set of backup parameters;
deleting, by the data management system based at least in part on the request, the set of backup parameters; and
transmitting, to the computing system via the interface, an indication that the set of backup parameters is deleted at the data management system, wherein the indication unlocks the set of backup parameters for deletion at the computing system.

9. The method of claim 1, further comprising:
determining, based at least in part on the value of the second generation identifier being greater than the value of the first generation identifier, that the value of the first generation identifier comprises a default value associated with a reset of the set of backup parameters as stored by the computing system;
modifying, by the data management system based at least in part on determining that the value of the first generation identifier comprises the default value, the set of backup parameters as stored by the data management system to match the first state of the set of backup parameters as stored by the computing system; and
modifying, by the data management system based at least in part on determining that the value of the first generation identifier comprises the default value, the value of the second generation identifier associated with the set of backup parameters as stored by the data management system to match the value of the first generation identifier associated with the set of backup parameters as stored by the computing system.

10. The method of claim 1, further comprising:
executing, by the data management system in accordance with a synchronization periodicity, a synchronization job for synchronization of backup parameters across the data management system and the computing system, wherein obtaining the first state of the set of backup parameters and the value of the first generation identifier is based at least in part on the synchronization job.

11. The method of claim 1, wherein obtaining the first state of the set of backup parameters and the first generation identifier comprises:
receiving, at the data management system via the interface associated with the computing system, a synchronization message that indicates the first state and the value of the first generation identifier, wherein the synchronization message is based at least in part on a change in the first state, a change in the value of the first generation identifier, or both at the computing system.

12. The method of claim 1, wherein the set of backup parameters comprises identifiers of a plurality of computing resources to be backed up by the data management system, one or more types associated with the plurality of computing resources, one or more labels associated with the plurality of computing resources, one or more names associated with the plurality of computing resources, one or more timing parameters associated with the backups by the data management system, a service level agreement associated with the plurality of computing resources, one or more workload resources associated with backups by the data management system, or any combination thereof.

13. An apparatus, comprising:
one or more memories storing processor-executable code; and
one or more processors coupled with the one or more memories and individually or collectively operable to execute the code to cause the apparatus to:
obtain, by a data management system and from a computing system via an interface associated with the computing system, a first state of a set of backup parameters as stored by the computing system and a value of a first generation identifier associated with the set of backup parameters as stored by the computing system, wherein the set of backup parameters is associated with backups, by the data management system, of data stored by the computing system;
compare, by the data management system, the first state of the set of backup parameters as stored by the computing system with a second state of the set of backup parameters as stored by the data management system;
compare, by the data management system, the value of the first generation identifier associated with the set of backup parameters as stored by the computing system with a value of a second generation identifier associated with the set of backup parameters as stored by the data management system; and
determine whether to modify the set of backup parameters as stored by the data management system, the second generation identifier of the set of backup parameters as stored by the data management system, or both based at least in part on comparing the first state with the second state and based at least in part on comparing the value of the first generation identifier with the value of the second generation identifier.

14. The apparatus of claim 13, wherein the one or more processors are individually or collectively further operable to execute the code to cause the apparatus to:
modify, by the data management system based at least in part on the first state of the set of backup parameters being different than the second state of the set of backup parameters, the set of backup parameters as stored by the data management system to match the first state of the set of backup parameters as stored by the computing system.

15. The apparatus of claim 13, wherein the one or more processors are individually or collectively further operable to execute the code to cause the apparatus to:

modify, by the data management system based at least in part on the value of the first generation identifier being different than the value of the second generation identifier, the value of the second generation identifier associated with the set of backup parameters as stored by the data management system to match the value of the first generation identifier associated with the set of backup parameters as stored by the computing system.

16. The apparatus of claim 13, wherein the one or more processors are individually or collectively further operable to execute the code to cause the apparatus to:
  transmit, by the data management system and via the interface associated with the computing system, a request for the computing system to modify the set of backup parameters as stored by the computing system to match the second state of the set of backup parameters as stored by the data management system, wherein the request is based at least in part on the first state of the set of backup parameters and the second state of the set of backup parameters being different and further based at least in part on the value of the first generation identifier and the value of the second generation identifier being the same.

17. The apparatus of claim 16, wherein the one or more processors are individually or collectively further operable to execute the code to cause the apparatus to:
  receive, at the data management system via the interface associated with the computing system, a synchronization message that indicates a change of the value of the first generation identifier to an updated value associated with the second state of the set of backup parameters as stored by the computing system; and
  modify, by the data management system based at least in part on the synchronization message, the value of the second generation identifier to match the updated value of the first generation identifier.

18. A non-transitory computer-readable medium storing code, the code comprising instructions executable by one or more processors to:
  obtain, by a data management system and from a computing system via an interface associated with the computing system, a first state of a set of backup parameters as stored by the computing system and a value of a first generation identifier associated with the set of backup parameters as stored by the computing system, wherein the set of backup parameters is associated with backups, by the data management system, of data stored by the computing system;
  compare, by the data management system, the first state of the set of backup parameters as stored by the computing system with a second state of the set of backup parameters as stored by the data management system;
  compare, by the data management system, the value of the first generation identifier associated with the set of backup parameters as stored by the computing system with a value of a second generation identifier associated with the set of backup parameters as stored by the data management system; and
  determine whether to modify the set of backup parameters as stored by the data management system, the second generation identifier of the set of backup parameters as stored by the data management system, or both based at least in part on comparing the first state with the second state and based at least in part on comparing the value of the first generation identifier with the value of the second generation identifier.

19. The non-transitory computer-readable medium of claim 18, wherein the instructions are further executable by the one or more processors to:
  modify, by the data management system based at least in part on the first state of the set of backup parameters being different than the second state of the set of backup parameters, the set of backup parameters as stored by the data management system to match the first state of the set of backup parameters as stored by the computing system.

20. The non-transitory computer-readable medium of claim 18, wherein the instructions are further executable by the one or more processors to:
  modify, by the data management system based at least in part on the value of the first generation identifier being different than the value of the second generation identifier, the value of the second generation identifier associated with the set of backup parameters as stored by the data management system to match the value of the first generation identifier associated with the set of backup parameters as stored by the computing system.

* * * * *